J. E. YARBROUGH.
LOOM.
APPLICATION FILED AUG. 7, 1911.
1,047,363.
Patented Dec. 17, 1912.
2 SHEETS—SHEET 1.
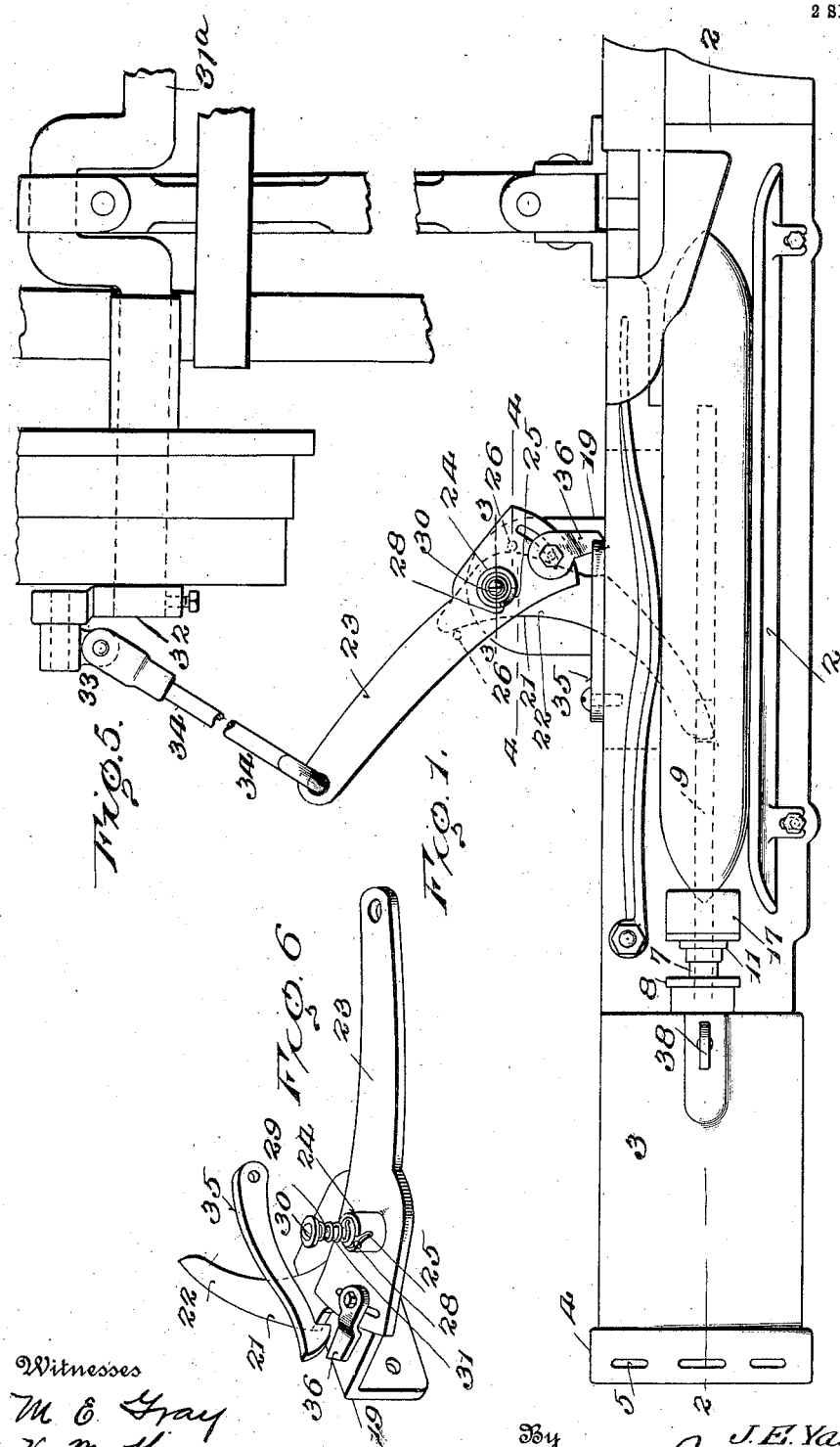
Witnesses
M. E. Gray
V. M. Hudson
Inventor
J. E. Yarbrough
By
Attorney

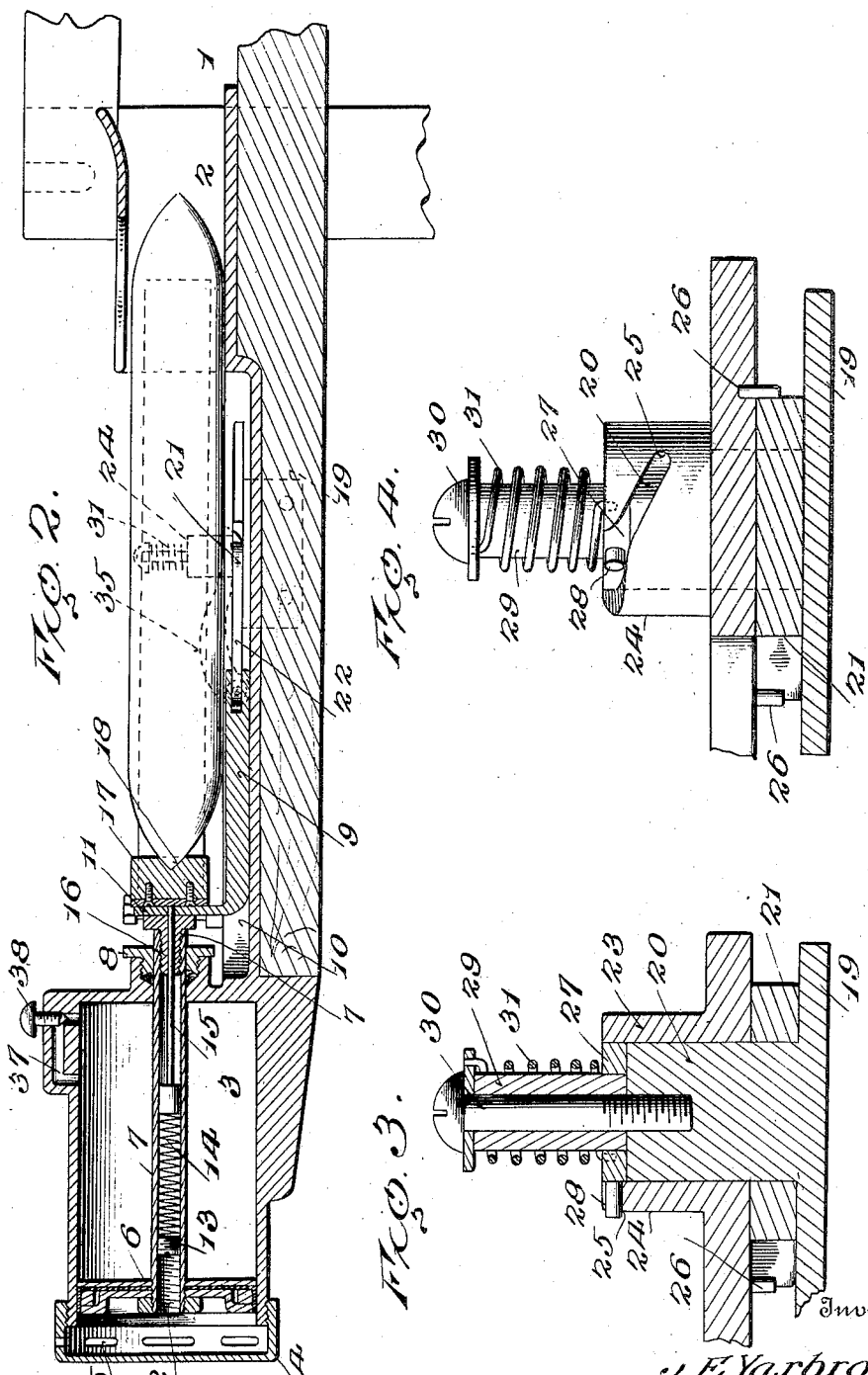

UNITED STATES PATENT OFFICE.

JOHN E. YARBROUGH, OF ATLANTA, GEORGIA.

LOOM.

1,047,363.
Specification of Letters Patent.
Patented Dec. 17, 1912.

Application filed August 7, 1911. Serial No. 642,627.

*To all whom it may concern:*

Be it known that I, JOHN E. YARBROUGH, a citizen of the United States, residing at Atlanta, in the county of Fulton and State of Georgia, have invented certain new and useful Improvements in Looms; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.
This invention relates generally to improvements in looms, and more particularly to a pick motion wherein an automatically created and controlled partial vacuum and subsequent restoration of atmospheric pressure sure is utilized as a motive power for the shuttle.

The main object of the present invention is the automatic creation and control of a vacuum in the pick motion mechanism and the arrangement of mechanical parts to cause the normal atmospheric pressure to act as a motive power for the shuttle upon the release of the vacuum holding means.

A further object of the invention is the arrangement of a vacuum creating means with such relation to the moving parts of the loom structure as to cause the vacuum created, or being created, to act as a positive, though resilient, brake to the loom in the event of breakage or other interference with the proper loom movement.

The invention in the preferred form of details will be described in the following specification, reference being had particularly to the accompanying drawings in which:

Figure 1 is a top plan view illustrating the shuttle operating means at one end of the lay. Fig. 2 is a vertical sectional view of the same on the line 2—2 of Fig. 1. Fig. 3 is a section on the line 3—3 of Fig. 1. Fig. 4 is a section on the line 4—4 of Fig. 1. Fig. 5 is a broken plan showing connection between the crank shaft and the shuttle operating means. Fig. 6 is a detail view.

Referring particularly to the accompanying drawings, 1 represents the lay and 2 the shuttle box, which together with the coöperating parts of the loom, except for the specific details hereinafter noted, will be in conventional or preferred type of structure for the purpose designed, there being no limitation in this respect in connection with the present invention.

At one end of the lay and formed integral therewith or separate therefrom as may be desired, is a cylinder 3, open at its free or outer end and exteriorly threaded for the reception of a cap 4 formed with a circumferential or otherwise arranged series of elongated openings 5 for a purpose which will presently appear. Within the cylinder is arranged in any desired air-tight manner a piston 6 having a centrally disposed, removably connected, hollow stem 7, the forward or inner end of which projects through a stuffing box 8 in the forward or inner wall of the cylinder, in line with the shuttle, within the adjacent box. The forward or inner end of the stem is connected to an operating bar 9, the main length of which operates in a slide-way 10 in the bottom of the box, directly beneath the shuttle, such main length being formed with an upturned rear end 11 directly connected to the piston stem.

The rear or outer end of the hollow stem is interiorly threaded at 12 to adjustably receive a stop plug 13 which plug forms an abutment for one end of a coil spring 14 housed within the stem and bearing at its opposite end against a buffer rod 15, the forward or inner end of which projects through and beyond the forward end of the hollow stem, being preferably movable through a guide sleeve 16 removably secured in the forward end of the stem. The forward end of the buffer rod projects through the portion 11 of the operating bar and is provided therebeyond with a more or less flexible buffer disk 17 centrally formed at 18 to correspond with the formation of the end of the shuttle. The spring 14 is so tensioned as to normally maintain the buffer disk 17 inwardly spaced from contact with the portion 11 of the operating bar, for a purpose which will later appear.

Secured on the lay at a point adjacent the cylinder 3 is a bracket 19 provided with a stub shaft or pintle 20. Pivotally mounted on the pintle 20 is a setting lever 21, having its inner or longer end 22 of such length that its free terminal projects into the channel 10 in position to engage the end of the operating bar 9. Mounted on the pintle 20 outwardly beyond the setting lever 21 is an operating lever 23, which lever in that portion encircling the pintle is formed with an upstanding sleeve 24 having a cam-way or groove 25 formed therein. That portion of the operating lever 23 overlying the setting lever 21 is formed with spaced depending pins 26, said pins being arranged on opposite sides of the pivot pintle and so disposed that when the operating lever is in contact with the setting lever and is moved in one direction, the pins 26 of the operating lever will contact with the setting lever, and in effect, lock said levers together for simultaneous operation in one direction, as will be plain from Fig. 1 of the drawings.

Secured upon the upper end of the pintle 20 is a disk 27 formed at an appropriate point with a laterally projecting pin 28, designed under certain conditions to coöperate with and travel in the cam groove 25 of the sleeve 24. The disk 27 loosely encircles a sleeve 29 secured upon the pintle by a screw bolt 30, a coil spring 31 encircling the sleeve and having one terminal secured thereto and the other terminal secured to the disk 27, as will be plain from Fig. 3 of the drawings.

31ª represents the crank shaft of the loom having the end adjacent the shuttle box provided with a crank 32 to which by a universal connection 33 there is connected one end of an operating rod 34, the opposite end of which is connected by an appropriate connection to the free or outer end of the operating lever 23.

Pivotally supported upon the lay immediately adjacent the bracket 19 is a latch 35 designed and formed at its free end to engage the setting lever 21 when the latter has been moved to its operative position, as will later appear, and adjustably supported upon the operating lever is a release dog 36 which, when the respective setting and operating levers are in normal positions, that is in contact, is on a plane below and out of the path of the latch.

If found necessary I contemplate providing the cylinder 3 at the inner or lay end with a bypass 37 controlled by a needle valve 38, which bypass serves to admit a small quantity of air in the vacuum end of the cylinder in the formation of the vacuum, whereby to cushion the piston in its operative movement.

In describing the practical operation of my invention, the position of various parts is given with relation to the position of the crank shaft, or upper shaft, of the loom. The positions of the crank on this shaft are divided into four points in the circle in which it travels, and these points are known as centers, as for example, "top center" which is the extreme high point of its travel. Power is derived from the crank shaft 31ª of the loom in connection with the forward movement of the lay. As the lay moves from the position known as "bottom center" to the position known as "forward center", it is clear that the crank 32 on the end of said shaft 31ª is passing about the front center and is therefore practically stationary relative to the lay, thereby causing the forward movement of the lay through the instrumentality of the swivel nut 33, and connecting rod 34, to move the operating lever 23, in a direction to carry the pins 26, against the setting lever 21, so as to move the latter in a direction to force the piston 6, outwardly in the cylinder 3, and create a vacuum in the inner end of said cylinder, whereupon the latch 35 will engage said lever and hold the same until the proper time for throwing the shuttle.

It is to be borne in mind that the shuttle is thrown from the left-hand end of the lay (as viewed in the drawings) to the right-hand end and back again during one complete cycle of operations and during which the crank shaft 31ª makes two complete revolutions. On the first revolution the piston 6, is forced back and latched, and on the second revolution the latch 35, is released by the adjustable dog 36, thus allowing the piston 6, to throw the shuttle across the lay. It is of course understood that there is an exactly similar mechanism on the other end of the lay that throws it back.

Having already described the operation of forcing the piston back and holding it until the proper time for releasing it, I shall now describe the operation of releasing the latch 35 so as to permit the piston to act. As the lay in its movement proceeds from the top center toward the bottom center, the operating lever 23, moves in a direction toward the lay while the setting lever 21, and its concomitant parts remain stationary. As the lay moves from this position the lever 21 again swings out from the lay and during this movement the cam groove 25 of the sleeve 24, which is part of the operating lever 23, comes into registry with the pin 28, of the disk 27, that is held down and back by the spring 31. Consequently the sleeve 24, will ride on said pin, thereby raising the lever 23, so as to cause the pins 26 to clear the lever 21, while by the same movement the dog 36, will be brought into the path of the latch 35, and release the latter, permitting the piston 6, to act to throw the shuttle. It is to be particularly remembered that on this movement of the lever 23, outward away from the lay, the setting lever is not engaged by the pins 26, having already been moved to its set or piston holding position, while on the previous movement of the lever 23 in the same direction, that is, away from the lay, the levers 23 and 21 were locked together by said pins, whereby the sleeve 24, when its slot 25 registered with the pin 28, could not ride upwardly, owing to the frictional resistance maintained between the pins 27 and the lever 21. Hence, the sleeve 24 merely overcame the torsional tension of the spring 31 and forced the pin 28 to turn with it instead of the cam riding thereon. In other words, the reason why the sleeve 24 does not rise and receive the pin 28 into the slot 25 of the sleeve in this movement, is because the pins 26 are engaging the lever 21 with sufficient friction or binding action to prevent the sleeve and lever 23 from moving upwardly on the pintle 20, and consequently, after the sleeve 24 turns to a position where the pin 28 will engage one wall of the slot 25 at the upper end of the latter, the spring 31 will merely yield and the disk 27 will be forced around. In the other movement of the lever 23 outward or away from the lay, there is, of course, no engagement of the pins 26 with the lever 21, and consequently, when the slot or groove 25 reaches the pin 28, the groove will receive the pin and the sleeve 24, and lever 23 will ride upwardly, whereby the dog 36 will be brought into the path of the latch 35 and release the latter, permitting the piston 6 to act to throw the shuttle.

As previously described the mechanical buffer provided by the buffer rod 15, the spring 14 and the buffer disk 17 is normally disposed in spaced relation to the portion 11 of the operating rod. Therefore, when the shuttle is shot into the box, this buffer acts as a check to the shuttle and at the same time, by compression on the spring, stores up a small amount of power for throwing the shuttle in the opposite direction.

From the above description it will be seen that either a forward or backward motion of the lay from the bottom center tends to set the piston 6 thereby forming a vacuum in the cylinder during either of said movements. This in addition to storing power for drawing the shuttle tends to utilize the vacuum as a positive though resilient brake to stop the loom incidentally in the event of breakage or other interference in its operating parts which would otherwise tend to an undesirable diminution of speed. There is an added advantage in the use of the vacuum as a brake, as would tend to stop the lay on the bottom center position, which is the correct position for replacing weft or drawing in threads. Furthermore, as the lay must be stopped dead and restored at the front of the loom, at which time the piston is being forced back, this must necessarily utilize to a large extent the power lost in overcoming the inertia of the lay as it is stopped and storing the same up for throwing the shuttle. This insures smooth running by removing strain from rocker arms and straps which actuate the lay. The power utilized for the pick motion is gathered throughout approximately a half revolution on the crank shaft and thus gradually provided for instead of suddenly as in the present type of pick motion.

It is of course to be understood as before stated that the mechanism herein described is duplicated at the opposite end of the lay in exactly similar arrangement and disposition, and that as described the improvement involves a material decrease in the number of moving parts of the usual pick motion, insures a smoother running of the loom and permits the parts to be made of metal or other indestructible material without disadvantage.

The outer end of the cylinder may be open but I preferably employ the cap with the elongated openings to form a muffler. Obviously when the cap is used, the noise due to the action of the air, will be greatly reduced.

Having thus described the invention, what is claimed is:—

1. In a pick motion for looms, a shuttle-throwing element, means for holding said element in set position for operation under atmospheric pressure, and means for automatically releasing said holding means to permit the restoration of atmospheric pressure for the purpose specified.

2. In a pick motion for looms, a shuttle throwing element, means operating on said element to create sub-atmospheric pressure and to hold said element in set position for operation under atmospheric pressure, means for automatically releasing said sub-atmospheric pressure-creating means, whereby to permit the restoration of atmospheric pressure, and means for automatically actuating the shuttle throwing element upon the restoration of said atmospheric pressure, for the purpose specified.

3. In a pick motion for looms, a shuttle throwing element, a piston operatively connected thereto, a cylinder in which said piston is mounted, means for automatically moving said element in a direction to create sub-atmospheric pressure on one side of said piston and for holding the same in set position for operation under atmospheric pressure, means for automatically releasing the sub-atmospheric pressure-creating means whereby to permit the restoration of atmospheric pressure, and means for automatically actuating the shuttle-throwing element upon the restoration of said atmospheric pressure for the purpose specified.

4. A loom pick motion, a power means therefor including a cylinder, a piston in said cylinder, mechanism actuated in the movement of the loom to form a vacuum in said cylinder acting against said piston, and means to release the piston at a predetermined time.

5. A loom pick motion, a power means therefor including a cylinder, coöperating levers operated in the movement of the loom, means intermediate said levers and cylinder to form a vacuum in the latter in a certain operation of the former, said means including a piston, and means operated in the movement of the loom at a predetermined time to release the piston.

6. A pick motion for looms, and an operating mechanism therefor, said mechanism including a cylinder, a piston therein, a setting lever to move the piston in one direction to form a vacuum within the cylinder, an operating lever to operate the setting lever, and means actuated by the operating lever to release the piston.

7. A pick motion for looms and an operating mechanism therefor including a cylinder, a piston therein, a setting lever to move the piston in one direction to form a vacuum within the cylinder, means to lock the setting lever in vacuum maintaining position, an operating lever to engage and actuate the setting lever when said operating lever is moved in one direction, and a connection between the operating lever and a moving part of the loom structure.

8. A pick motion for looms and an operating mechanism therefor including a cylinder, a piston therein, a setting lever to move the piston in one direction to form a vacuum within the cylinder, means to lock the setting lever in vacuum maintaining position, an operating lever, means for locking said operating lever to the setting lever in the movement of the operating lever in one direction from a given point, means automatically operated in the movement of the latter lever to space the same from the setting lever to prevent the locking of said levers, whereby to free the operating lever from the setting lever, and means actuated by the operating lever to release the vacuum forming lock of the setting lever during movement of the operating lever under the influence of the spacing means.

9. In a pick motion for looms and an operating mechanism therefor, including a cylinder, a piston therein, a setting lever, an operating lever arranged to move the setting lever in a direction to force the piston outwardly in the cylinder to create an abnormal air pressure, means for locking the setting lever in this position, means permitting a subsequent movement of the operating lever in the same direction without affecting the setting lever, and means operable for a predetermined period in the operation of the loom by and upon the movement of the operating lever to release the holding means of the setting lever.

10. A pick motion for looms and an operating mechanism therefor, including a cylinder, a piston therein, a setting lever arranged to move the piston in the cylinder in a direction to create an abnormal air pressure therein, means for latching the setting lever in its operative position, an operating lever movable about the same pivot with the setting lever and provided with pins engageable with the setting lever to move the latter, means for moving the operating lever in a definite plane to operate the second lever, and means for automatically moving the operating lever in another plane whereby the pins of said lever will clear the setting lever, and a releasing device carried by said operating lever and movable into engagement with the latching means of the setting lever to release the latter in the second named movement of the operating lever.

11. A pick motion for looms and an operating mechanism therefor, including a cylinder, a piston therein, a setting lever arranged to move the piston in a direction to create sub-atmospheric pressure in the cylinder, an operating lever provided with a sleeve formed with a cam recess, a spring pressed pin movable into said recess, means carried by said operating lever to engage the setting lever to move the latter in a direction to force the piston in the cylinder as hereinbefore specified, means for latching the setting lever, and a dog carried by the operating lever and arranged to engage the latching means to release the same upon the movement of the pin into the cam recess of said sleeve.

12. In a pick motion for looms, power means, a shuttle operating mechanism therefor, said operating mechanism including two elements, one fitting within the other and one of said elements being operated by the power means to form a vacuum between both said elements, and automatic means for releasing the vacuum to cause one of the elements to operate a shuttle.

13. In a pick motion for looms, a shuttle throwing element periodically operated, means for forming a vacuum for operating the shuttle throwing element, and an automatic tripping device for releasing the vacuum into operation.

In testimony whereof I have signed my name to this specification in the presence of two subscribing witnesses.

JOHN E. YARBROUGH.

Witnesses:
CLIFTON CORLEY,
W. W. CORLEY.